(12) United States Patent
Karampatsis et al.

(10) Patent No.: US 12,495,037 B2
(45) Date of Patent: Dec. 9, 2025

(54) AUTHENTICATION FOR A NETWORK SERVICE

(71) Applicant: Lenovo (Singapore) Pte. Ltd., New Tech Park (SG)

(72) Inventors: Dimitrios Karampatsis, Ruislip (GB); Andreas Kunz, Ladenburg (DE); Sheeba Backia Mary Baskaran, Friedrichsdorf (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 98 days.

(21) Appl. No.: 18/547,132

(22) PCT Filed: Feb. 18, 2022

(86) PCT No.: PCT/IB2022/051481
§ 371 (c)(1),
(2) Date: Aug. 18, 2023

(87) PCT Pub. No.: WO2022/175895
PCT Pub. Date: Aug. 25, 2022

(65) Prior Publication Data
US 2024/0154953 A1    May 9, 2024

Related U.S. Application Data

(60) Provisional application No. 63/151,490, filed on Feb. 19, 2021.

(51) Int. Cl.
*H04L 9/40* (2022.01)
(52) U.S. Cl.
CPC .................................. *H04L 63/083* (2013.01)
(58) Field of Classification Search
CPC ............... H04L 63/083; H04L 63/0853; H04L 63/0807
See application file for complete search history.

(56) References Cited

U.S. PATENT DOCUMENTS

| | | | | |
|---|---|---|---|---|
| 2014/0090027 | A1* | 3/2014 | Tamura | G06F 21/41 726/4 |
| 2018/0278603 | A1* | 9/2018 | Yabe | H04L 63/08 |

(Continued)

FOREIGN PATENT DOCUMENTS

JP    2003249944 A    9/2003

OTHER PUBLICATIONS

PCT/IB2022/051481, "International Search Report and the Written Opinion of the International Searching Authority, or the Declaration", International Searching Authority, May 30, 2022, pp. 1-13.

(Continued)

*Primary Examiner* — Catherine Thiaw
*Assistant Examiner* — Nega Woldemariam
(74) *Attorney, Agent, or Firm* — Kunzler Bean & Adamson

(57) ABSTRACT

Apparatuses, methods, and systems are disclosed for authentication for a network service. One method includes receiving, at a first network device from a second network device, a network function service request to execute a service on a third network device. The request includes first credentials for authentication with a first network device and second credentials for authentication with the third network device. The method includes determining whether the first credentials provided are valid and execute the service request by determining the third network device to execute the service requested from the second network device. The method includes transmitting, to a fourth network device, a request for authentication with the third network device. The request includes an identifier of the third network device and second credentials of the second network device.

16 Claims, 10 Drawing Sheets

(56) References Cited

U.S. PATENT DOCUMENTS

| | | | |
|---|---|---|---|
| 2018/0337784 A1* | 11/2018 | Jain | G06F 21/335 |
| 2019/0028485 A1* | 1/2019 | Baird | H04L 67/146 |
| 2020/0023812 A1* | 1/2020 | Hassani | H04L 67/306 |
| 2020/0305055 A1* | 9/2020 | Basu Mallick | H04W 36/08 |
| 2021/0127265 A1* | 4/2021 | Chandramouli | H04W 12/08 |
| 2021/0250344 A1* | 8/2021 | Qi | H04W 12/06 |
| 2022/0116400 A1* | 4/2022 | Khare | H04L 63/083 |
| 2023/0276509 A1* | 8/2023 | Karampatsis | H04W 4/08 370/329 |
| 2024/0129729 A1* | 4/2024 | Baskaran | H04W 12/06 |
| 2024/0154953 A1* | 5/2024 | Karampatsis | H04L 63/0807 |
| 2024/0163672 A1* | 5/2024 | Comak | H04W 12/069 |
| 2024/0187856 A1* | 6/2024 | Atarius | H04W 12/069 |

OTHER PUBLICATIONS

Nokia et al., "KI#11, Updates to Solution #9", SA WG2 Meeting #141E S2-2008057, Oct. 12-23, 2020, pp. 1-12.

Nokia et al., "KI on Authorization of consumers for data access via Dccf", 3GPP TSG-SA3 Meeting #102-e S3-210116, Jan. 18-29, 2021, pp. 1-2.

Nokia et al., "Authorization of NF Service Consumers for data access via DCCF", 3GPP TSG-SA3 Meeting #103-e S3-212161, May 17-28, pp. 1-5.

3GPP, "3rd Generation Partnership Project; Technical Specification Group Services and System Aspects; Study on security aspects of enablers for Network Automation (eNA) for the 5G system (5GS) Phase 2; (Release 17)", 3GPP TR 33.866 V0.3.0, Jan. 2021, pp. 1-16.

3GPP, "3rd Generation Partnership Project; Technical Specification Group Services and System Aspects; Procedures for the 5G System (5GS); Stage 2 (Release 16)", 3GPP TS 23.502 V16.7.1, Jan. 2021, pp. 1-603.

3GPP, "3rd Generation Partnership Project; Technical Specification Group Services and System Aspects; Security architecture and procedures for 5G system (Release 16)", 3GPP TS 33.501 V16.4.0, Sep. 2020, pp. 1-250.

* cited by examiner

AUTHENTICATION FOR A NETWORK SERVICE

CROSS-REFERENCE TO RELATED APPLICATIONS

This application claims priority to U.S. Patent Application Ser. No. 63/151,490 entitled "APPARATUSES, METHODS, AND SYSTEMS FOR AUTHORIZING AN NF SERVICE CONSUMER TO ACCESS A SERVICE FROM AN NF SERVICE PRODUCER INDIRECTLY VIA AN INTERMEDIATE NF" and filed on Feb. 19, 2021 for Dimitrios Karampatsis, which is incorporated herein by reference in its entirety.

FIELD

The subject matter disclosed herein relates generally to wireless communications and more particularly relates to authentication for a network service.

BACKGROUND

In certain wireless communications networks, a device may be authorized to access a service. In such networks, authorization for a service may not be supported indirectly.

BRIEF SUMMARY

Methods for authentication for a network service are disclosed. Apparatuses and systems also perform the functions of the methods. One embodiment of a method includes receiving, at a first network device from a second network device, a network function service request to execute a service on a third network device. The request includes first credentials for authentication with a first network device and second credentials for authentication with the third network device. In some embodiments, the method includes determining whether the first credentials provided are valid and execute the service request by determining the third network device to execute the service requested from the second network device. In certain embodiments, the method includes transmitting, to a fourth network device, a request for authentication with the third network device. The request includes an identifier of the third network device and second credentials of the second network device. In various embodiments, the method includes receiving, from the fourth network device, third credentials for initiating a network function (NF) service with the third network function. In some embodiments, the method includes transmitting, to the third network device, a request for initiation of the NF service. The request includes authentication credentials including the second credentials and the third credentials.

One apparatus for authentication for a network service includes a first network device. In some embodiments, the apparatus includes a receiver that receives, from a second network device, a network function service request to execute a service on a third network device. The request includes first credentials for authentication with a first network device and second credentials for authentication with the third network device. In various embodiments, the apparatus includes a processor that determines whether the first credentials provided are valid and execute the service request by determining the third network device to execute the service requested from the second network device. In certain embodiments, the apparatus includes a transmitter that transmits, to a fourth network device, a request for authentication with the third network device. The request includes an identifier of the third network device and second credentials of the second network device. The receiver receives, from the fourth network device, third credentials for initiating a network function (NF) service with the third network function. The transmitter transmits, to the third network device, a request for initiation of the NF service. The request includes authentication credentials including the second credentials and the third credentials.

Another embodiment of a method for authentication for a network service includes transmitting, from a second network device to a fourth network device, a request for authorization to access services of a first network device. In some embodiments, the method includes receiving, from the fourth network device, first credentials including of an access token. In certain embodiments, the method includes transmitting, to a first network device, a network function service request to execute a service from a third network device, the network function service request comprising the first credentials for authentication with the first network device and second credentials for authentication with the third network device. The first credentials include a first access token and second credentials include a second access token generated by the second network device. In various embodiments, the method includes receiving, from the first network device, a response to the network function service request.

Another apparatus for authentication for a network service includes a second network device. In some embodiments, the apparatus includes a transmitter that transmits, to a fourth network device, a request for authorization to access services of a first network device. In various embodiments, the apparatus includes a receiver that receives, from the fourth network device, first credentials including an access token. The transmitter transmits, to a first network device, a network function service request to execute a service from a third network device, the network function service request including the first credentials for authentication with the first network device and second credentials for authentication with the third network device. The first credentials include a first access token and second credentials include a second access token generated by the second network device. The receiver receives, from the first network device, a response to the network function service request.

A further embodiment of a method for authentication for a network service includes receiving, at a fourth network device from a first network device, a request for authentication with a third network device. The request includes first credentials including an access token of a second network device and identifiers of the third network device. In some embodiments, the method includes determining whether the first network device and the second network device are allowed to access a service of the third network device. In certain embodiments, the method includes, in response to determining that the first network device and the second network device are allowed to access the service, generating second credentials including a second access token. In various embodiments, the method includes transmitting, to the first network device, the second credentials for initiating the NF service.

A further apparatus for authentication for a network service includes a fourth network device. In some embodiments, the apparatus includes a receiver that receives, from a first network device, a request for authentication with a third network device. The request includes first credentials including an access token of a second network device and identifiers of the third network device. In various embodiments, the apparatus includes a processor that: determines whether the first network device and the second network device are allowed to access a service of the third network device; and, in response to determining that the first network device and the second network device are allowed to access the service, generates second credentials including a second access token. In certain embodiments, the apparatus includes a transmitter that transmits, to the first network device, the second credentials for initiating the NF service.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
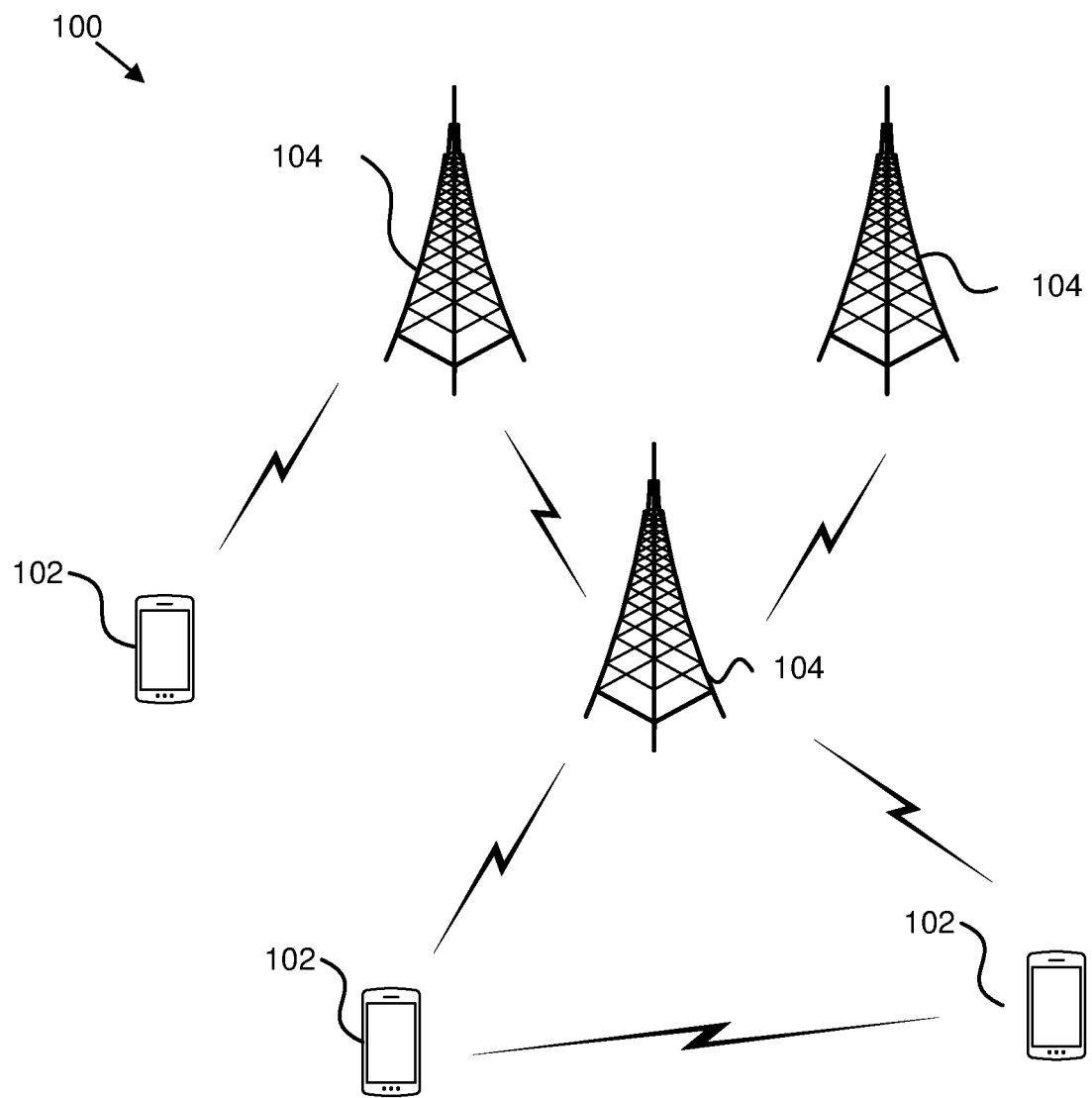
FIG. 1 is a schematic block diagram illustrating one embodiment of a wireless communication system for authentication for a network service.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for authentication for a network service. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, user equipment ("UE"), user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive, at a first network device from a second network device, a network function service request to execute a service on a third network device. The request includes first credentials for authentication with a first network device and second credentials for authentication with the third network device. In some embodiments, the network unit 104 may determine whether the first credentials provided are valid and execute the service request by determining the third network device to execute the service requested from the second network device. In certain embodiments, the network unit 104 may transmit, to a fourth network device, a request for authentication with the third network device. The request includes an identifier of the third network device and second credentials of the second network device. In various embodiments, the network unit 104 may receive, from the fourth network device, third credentials for initiating a network function (NF) service with the third network function. In some embodiments, the network unit 104 may transmit, to the third network device, a request for initiation of the NF service. The request includes authentication credentials including the second credentials and the third credentials. Accordingly, the network unit 104 may be used for authentication for a network service.

In certain embodiments, a network unit 104 may transmit, from a second network device to a fourth network device, a request for authorization to access services of a first network device. In some embodiments, the network unit 104 may receive, from the fourth network device, first credentials including of an access token. In certain embodiments, the network unit 104 may transmit, to a first network device, a network function service request to execute a service from a third network device, the network function service request comprising the first credentials for authentication with the first network device and second credentials for authentication with the third network device. The first credentials include a first access token and second credentials include a second access token generated by the second network device. In various embodiments, the network unit 104 may receive, from the first network device, a response to the network function service request. Accordingly, the network unit 104 may be used for authentication for a network service.

In some embodiments, a network unit 104 may receive, at a fourth network device from a first network device, a request for authentication with a third network device. The request includes first credentials including an access token of a second network device and identifiers of the third network device. In some embodiments, the network unit 104 may determine whether the first network device and the second network device are allowed to access a service of the third network device. In certain embodiments, the network unit 104 may, in response to determining that the first network device and the second network device are allowed to access the service, generate second credentials including a second access token. In various embodiments, the network unit 104 may transmit, to the first network device, the second credentials for initiating the NF service. Accordingly, the network unit 104 may be used for authentication for a network service.

Figure 2:
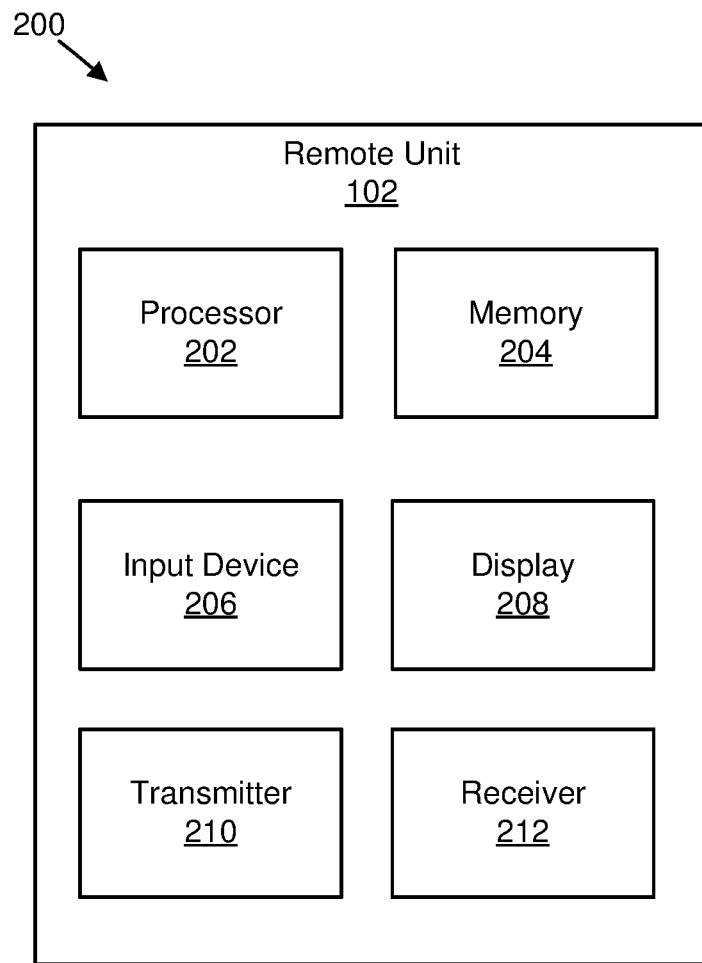
FIG. 2 is a schematic block diagram illustrating one embodiment of an apparatus that may be used for authentication for a network service.

FIG. 2 depicts one embodiment of an apparatus 200 that may be used for authentication for a network service. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations.

For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
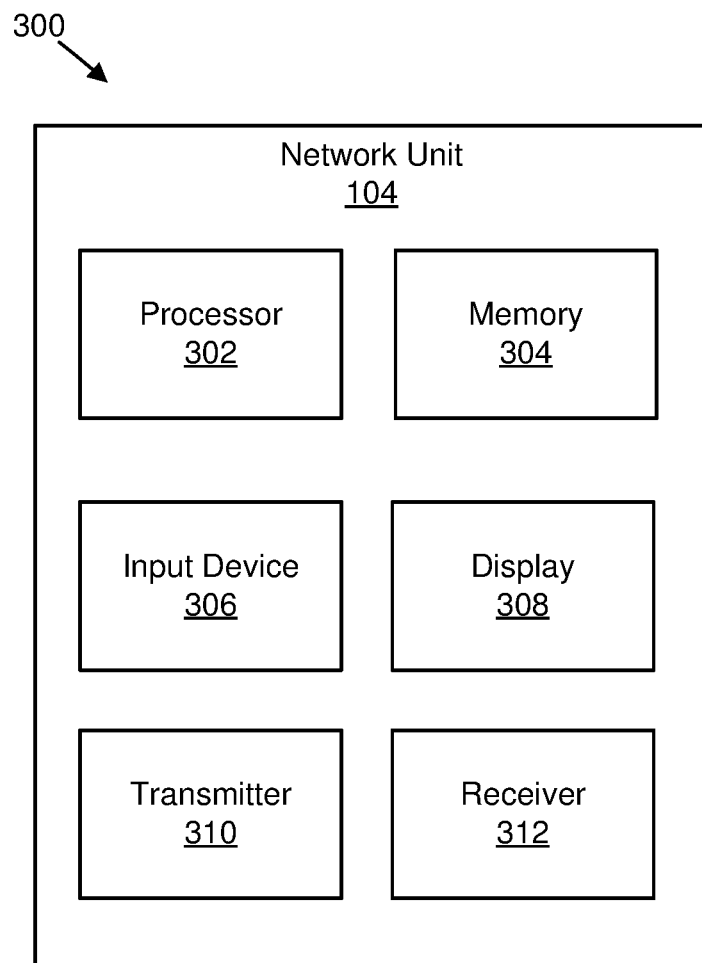
FIG. 3 is a schematic block diagram illustrating one embodiment of an apparatus that may be used for authentication for a network service.

FIG. 3 depicts one embodiment of an apparatus 300 that may be used for authentication for a network service. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 receives, from a second network device, a network function service request to execute a service on a third network device. The request includes first credentials for authentication with a first network device and second credentials for authentication with the third network device. In various embodiments, the processor 302 determines whether the first credentials provided are valid and execute the service request by determining the third network device to execute the service requested from the second network device. In certain embodiments, the transmitter 310 transmits, to a fourth network device, a request for authentication with the third network device. The request includes an identifier of the third network device and second credentials of the second network device. The receiver 312 receives, from the fourth network device, third credentials for initiating a network function (NF) service with the third network function. The transmitter 310 transmits, to the third network device, a request for initiation of the NF service. The request includes authentication credentials including the second credentials and the third credentials.

In some embodiments, the transmitter 310 transmits, to a fourth network device, a request for authorization to access services of a first network device. In various embodiments, the receiver 312 receives, from the fourth network device, first credentials including an access token. The transmitter 310 transmits, to a first network device, a network function service request to execute a service from a third network device, the network function service request including the first credentials for authentication with the first network device and second credentials for authentication with the third network device. The first credentials include a first access token and second credentials include a second access token generated by the second network device. The receiver 312 receives, from the first network device, a response to the network function service request.

In various embodiments, the receiver 312 receives, from a first network device, a request for authentication with a third network device. The request includes first credentials including an access token of a second network device and identifiers of the third network device. In various embodiments, the processor 302: determines whether the first network device and the second network device are allowed to access a service of the third network device; and, in response to determining that the first network device and the second network device are allowed to access the service, generates second credentials including a second access token. In certain embodiments, the transmitter 310 transmits, to the first network device, the second credentials for initiating the NF service.

In certain embodiments, there may be a data collection coordination function ("DCCF") that coordinates collection of data from one or more network functions ("NFs") based on data collection requests from one or more consumer NFs.

Figure 4:
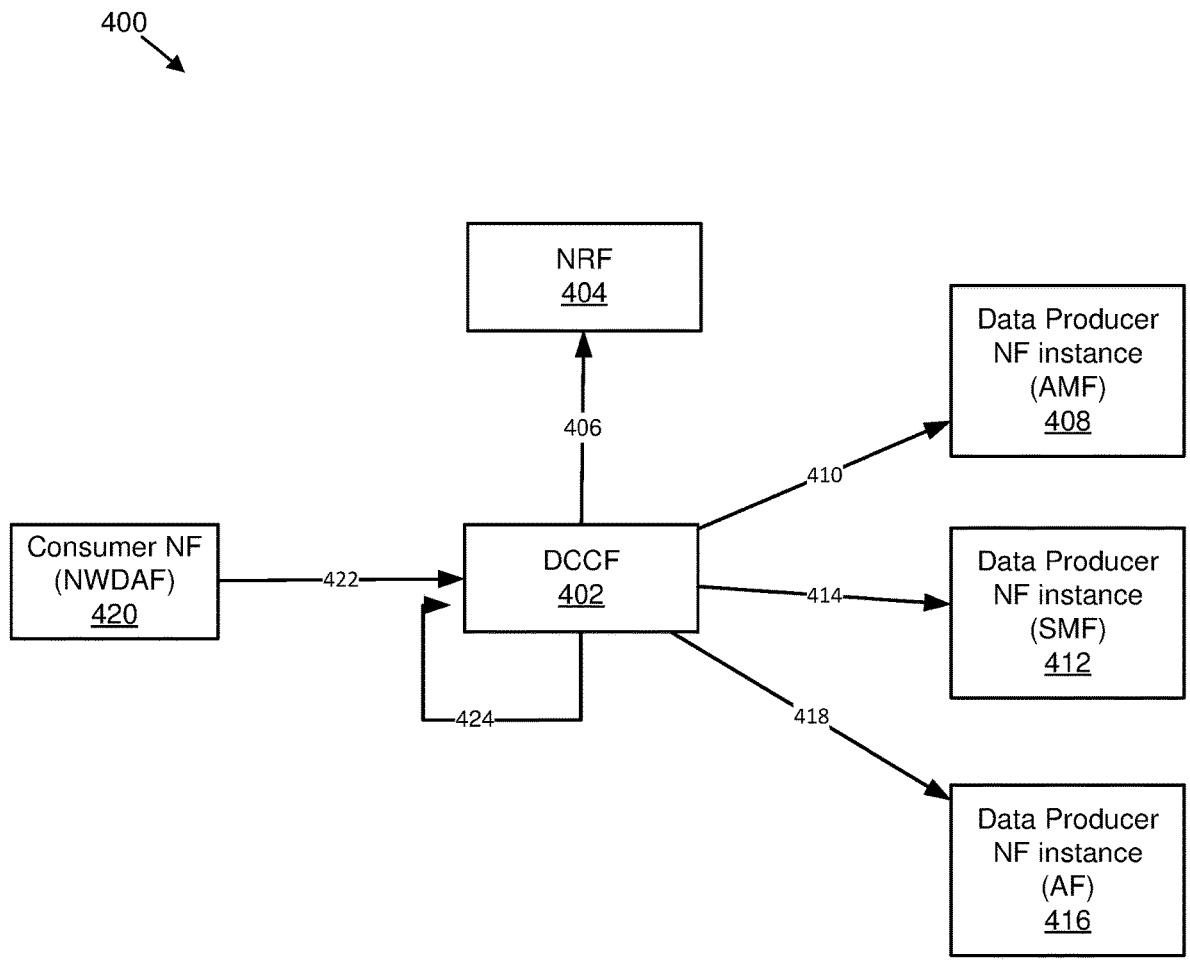
FIG. 4 is a schematic block diagram illustrating one embodiment of a system for data collection via a DCCF.

FIG. 4 is a schematic block diagram illustrating one embodiment of a system 400 for data collection via a DCCF. The system 400 includes a DCCF 402, a network repository function ("NRF") 404 (the DCCF 402 discovers an NF with a transmission 406 to the NRF 404), a data producer NF instance 408 (e.g., AMF) (the DCCF 402 transmits 410 an event exposure (e.g., Event ID) to the data producer NF instance 408), a data producer NF instance 412 (e.g., SMF) (the DCCF 402 transmits 414 an event exposure (e.g., Event ID) to the data producer NF instance 412), a data producer NF instance 416 (e.g., application function ("AF")) (the DCCF 402 transmits 418 an event exposure (e.g., Event ID) to the data producer NF instance 416), and a consumer NF (e.g., network data analytics function ("NWDAF")) 420 (the consumer NF 420 transmits 422 an Ndccf Request data with Event IDs to the DCCF 402). The DCCF 402 determines 424 a data producer NF based on one or more Event IDs.

The procedure of FIG. 4 to collect data via the DCCF 402 may be as follows: 1) the consumer NF 420 requests data via invoking an Ndccf service operation to the DCCF 402—in the request, the consumer NF 420 includes the Event IDs for data collection (e.g., Event IDs supported by each NF); 2) as there are specific Event IDs supported by each NF, the DCCF 402 determines the NF type (e.g., AMF, SMF, AF) from the Event IDs requested by the consumer NF 420 and determines the NF instance that has the required data from the NRF 404; and 3) the DCCF 402 then subscribes to be notified of the events from each NF type using an Nnf_Event_Exposure subscription.

Figure 5:
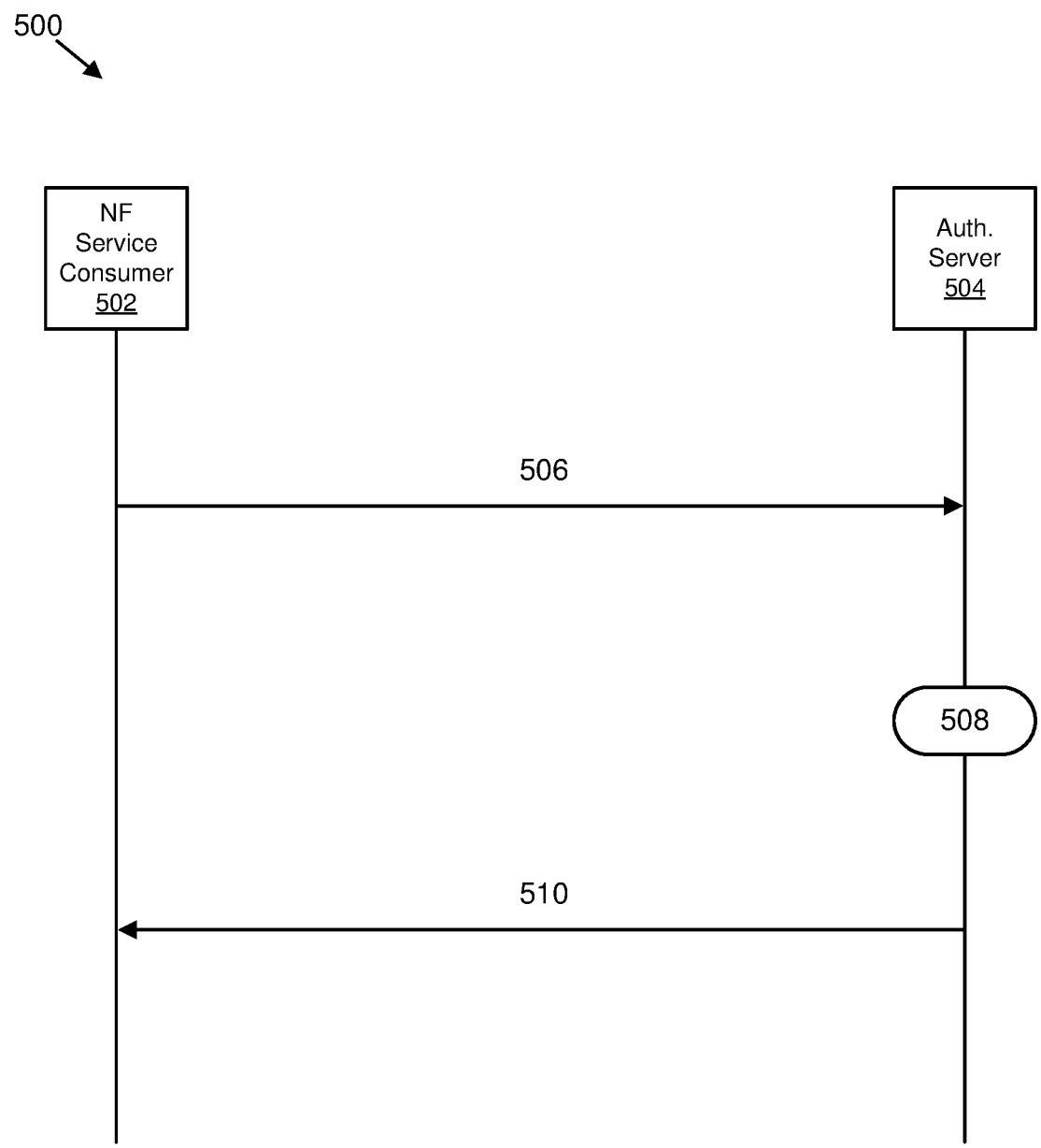
FIG. 5 is a schematic block diagram illustrating one embodiment of a system for NF service consumers requesting to access a service from an NF service producer from an NRF.
Figure 6:
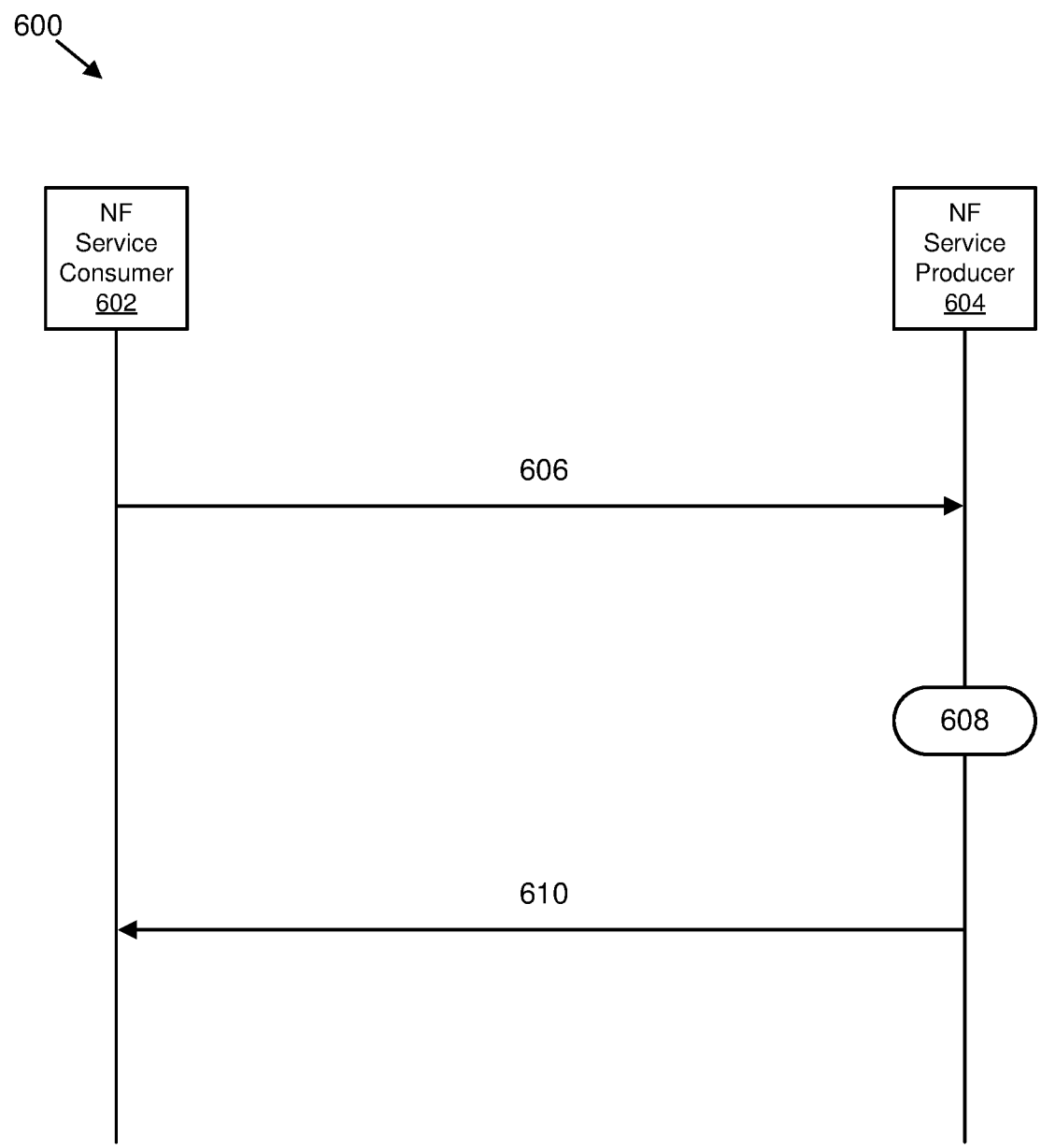
FIG. 6 is a schematic block diagram illustrating one embodiment of a system for an NF service producer to execute a requested service based on an access token.

In some embodiments, if an NF service consumer requests to invoke a service (e.g., a data collection request) from an NF service producer, the NF service consumers requests from the NRF access for the service as shown in FIG. 5. The NRF determines if the NF service consumer is authorized to access the service and upon of authorization approval provides an access token to the NF service consumer that the service consumer includes when initiating the service request to the NF service producer, as shown in FIG. 6. The NF service producer validates with the NRF if the access token is valid before accepting the service.

FIG. 5 is a schematic block diagram illustrating one embodiment of a system 500 for NF service consumers requesting to access a service from an NF service producer from an NRF. The system 500 includes an NF service consumer 502 (e.g., NWDAF) and an authorization (e.g., auth.) server 504 (e.g., NRF). Each of the communications illustrated may include one or more messages.

In a first communication 506, the NF service consumer 502 transmits an Nnrf_Access Token_Get Request that may include expected NF service names and an NF type:source NF to the authorization server 504. The authorization server 504 may authorize 508 the client and generate an access token. In a second communication 510, the authorization server 504 transmits an Nnrf_Access Token_Get Response that may include expires_in and access_token to the NF service consumer 502.

FIG. 6 is a schematic block diagram illustrating one embodiment of a system 600 for an NF service producer to execute a requested service based on an access token. The system 600 includes an NF service consumer 602 and an NF service producer 604. Each of the communications illustrated may include one or more messages.

In a first communication 606, the NF service consumer 602 transmits an NF service request which may include an access token to the NF service producer 604. The NF service producer 604 may verify the integrity and claims in the access token. If successful, the NF service producer 604 may execute the requested service. In a second communication 610, the NF service producer 604 transmits an NF service response to the NF service consumer 602.

In certain embodiments, a DCCF allows a path for an NF service consumer ("NFc") to access data from data sources or an NF service producer ("NFp"). Due to the use of a DCCF between a consumer and a producer, an existing security mechanism may not be sufficient, and the following may be addressed: 1) based on a request from a DCCF, a messaging framework may provide data from a producer to a requesting data consumer even though the consumer is not authorized to receive this data; and/or 2) based on a request from DCCF data received from a data producer is stored in a data repository function ("DRF"). When the data if later retrieved, the DCCF may provide the stored data to a non-authorized consumer, if requested.

In some embodiments, a data producer may be unable to correctly verify an identity of a data consumer since the data request is coming from a DCCF on behalf of a consumer.

In various embodiments, authorization to access a service is not supported indirectly via an intermediate NF (e.g., the DCCF).

In certain embodiments, a DCCF verifies that a request for retrieval of data by a data consumer NF (e.g., NWDAF) is authorized to be retrieved by identified data producer NFs (e.g., AMF, SMF, AF) and OAM.

In a first embodiment, there may be an access token based solution.

In some embodiments, if a NF service consumer (e.g., NWDAF) determines that data can be collected via a data collection coordination function before establishing an NF service request (e.g., an Ndccf_DataManagement_request service operation) to retrieve the required data with a DCCF, the NF service consumer may request authorization from an NRF by requesting an access token. In the request, the NF service consumer includes information that identifies the target NF (e.g., DCCF) and information to identify the NF service consumer (e.g., NWDAF). The NF service consumer uses the received access token provided by the NRF to establish the NF service to request the data with the DCCF. This token is the intermediate_access_token. In various embodiments, an NF consumer may generate a client credentials assertion ("CCA") token and include the CCA in the NF service request to the DCCF. The CCA may be used to verify authenticity of the NF service consumer.

In certain embodiments, if a DCCF determines that the data must be retrieved by a different NF service producer, the DCCF determines if the NF service consumer is authorized to retrieve data (and access the NF service) from the identified NF service producer NFs. This may be supported by the DCCF requesting authorization by requesting an access token with a transmission to an NRF. The DCCF includes, in the authorization request information that identifies the target NF (e.g., the NF service producers), information to identify the NF service initiator (e.g., DCCF) and additional authorization information to identify the NF service consumer that will eventually receive the data. The DCCF may also include the CCA if provided by the NF service consumer. In some embodiments, as additional authorization information, the DCCF includes the intermediate_access_token provided by the NF service consumer. The NRF authorizes the request by verifying that the DCCF can access the services from the NF service producer and also verifying, based on the received intermediate_access_token, whether the NF service consumer is also authorized to access the services from the service producer NFs. The NRF may also use the CCA of the service consumer NF, if provided by the DCCF, to verify the authenticity of the NF service consumer. The NRF allocates a new access token (e.g., dccf_access_token) to send a service request (e.g., requests for data using the event exposure service operation) towards the service producer NFs.

Figure 7:
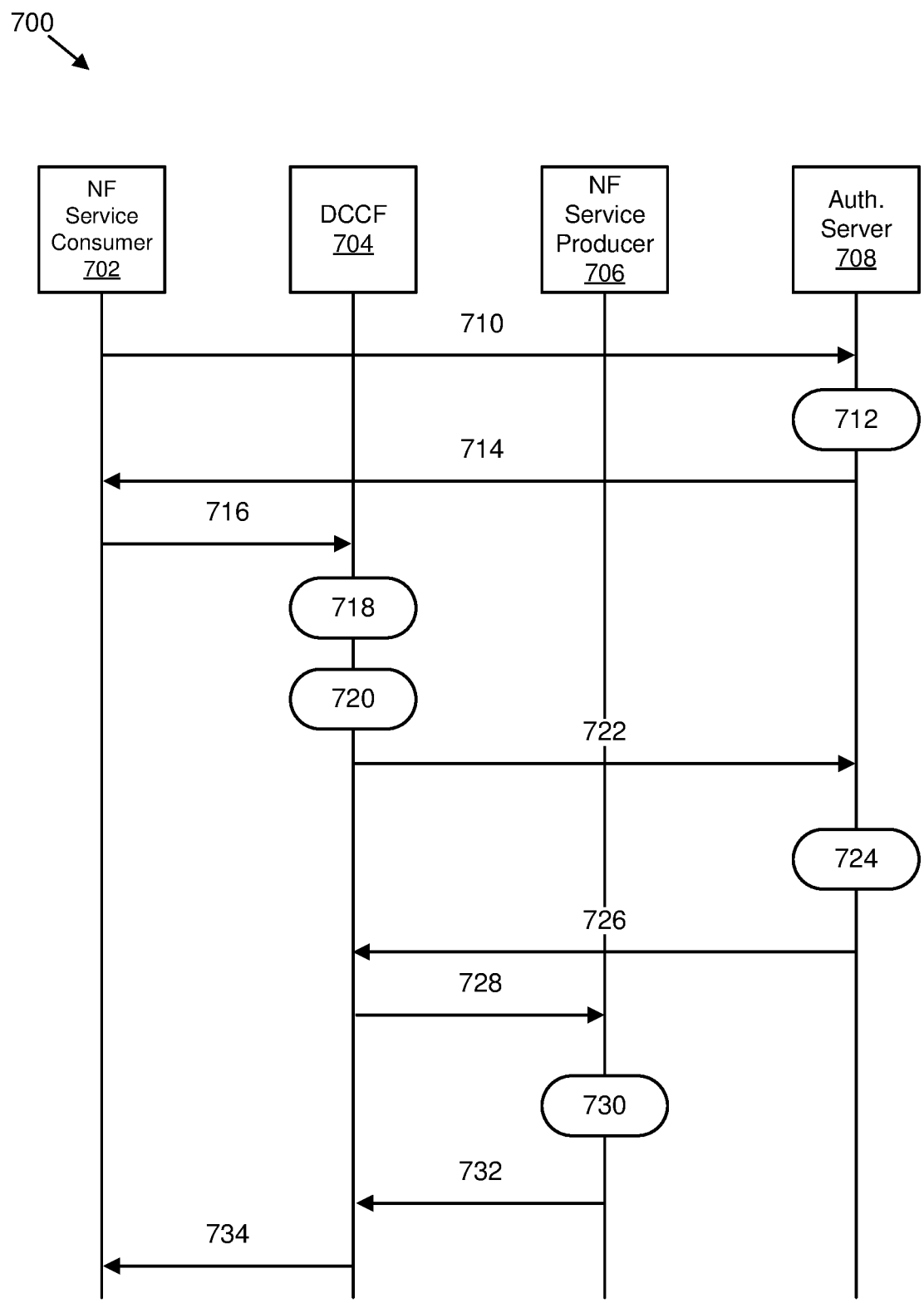
FIG. 7 is a schematic block diagram illustrating one embodiment of a system for authorizing access to a service via an intermediate NF.

FIG. 7 is a schematic block diagram illustrating one embodiment of a system 700 for authorizing access to a service via an intermediate NF. The system 700 includes an NF service consumer 702 (e.g., NWDAF), a DCCF 704, an NF service producer 706, and an authorization server 708 (e.g., NRF). Each of the communications in FIG. 7 may include one or more messages.

In a first communication 710, the NF service consumer 702 (e.g., NWDAF) discovers the DCCF 704 NF to retrieve data. The NF Service consumer 702 requests authorization from the NRF by invoking an Nnrf_AccessToken_Get request including the information to identify the target NF (e.g., DCCF 704) and the source NF.

The NRF authorizes 712 the request and generates an access token.

In a second communication 714, the access token (e.g., intermediate_access_token) is provided to the NF service consumer 702. The intermediate_access_token includes information which includes information to identify the NRF (e.g., issuer of the access token), the NF instance ID of the NF consumer (e.g., the NF service requester), and the NF instance IDs of the NF service producers (e.g., the DCCF 704).

In a third communication 716, the NF service consumer 702 initiates an NF service request to the DCCF 704 (e.g., if the NF service consumer is the NWDAF, the NWDAF sends an Ndccf_DataManagement request) which includes the intermediate_access_token. In some embodiments, in the request to the DCCF 704 the NF service consumer 702 generates a CCA token and include it in the request message to authenticate itself towards the NRF if the request is sent via the DCCF 704.

The DCCF 704 verifies 718 that the intermediate access token is valid and executes the service.

Moreover, the DCCF 704 determines 720 that the requested service is provided by a different NF service producer other than the DCCF 704 (e.g., in case of NWDAF, the DCCF 704 determines that the requested data is produced by different NFs). Since the service is provided by different NFs, the DCCF 704 verifies that the NF service consumer 702 can access (e.g., indirectly) the services provided by the identified NF service producers.

In a fourth communication 722, the DCCF 704 requests authorization from the NRF by invoking an Nnrf_AccessToken_Get request including the information to identify the target NF (e.g., NF service producer 706), the source NF (e.g., DCCF 704) and additional authorization information by including the intermediate_access_token. In addition, the DCCF 704 includes the CCA token if provided by the NF service consumer 702. The additional authorization information is provided to verify that the NF service consumer 702 is allowed to use the services provided by the identified NF service consumers.

The NRF determines 724 whether the DCCF 704 and the service consumer NF 702 (e.g., based on the intermediate access token) are allowed to access the service provided by the identified NF service producers. If the authorization request received includes a CCA token generated by the NF service consumer 706, the NRF verifies the NF service consumer 706 based on the CCA token.

In a fifth communication 726, the NRF generates and provides an access token to the DCCF 704.

In a sixth communication 728, the DCCF 704 uses the access token to initiate an NF service to the identified NF service producers (e.g., NF service producer 706). The DCCF also includes the CCA token if provided by the NF service consumer.

The NF service producer 706 (or producers) verifies 730 the access token and CCA token if provided and executes the service.

In a seventh communication 732, the NF service producer 706 (or producers) provide requested data in a response.

In an eighth communication 734, the DCCF 704 forwards the provided data to the NF service consumer 702 in a response.

In some embodiments, to ensure efficient use of signaling, if the DCCF 704 receives the access_token and determines that the DCCF 704 has an existing NF service connection from the same NF service producer 706 instances, the DCCF 704 may re-use the existing NF instance to obtain the data requested by the NF service consumer 702 instead of creating a new NF service request transmitted to the same NF service producer 706 instances to retrieve the data.

In various embodiments, if the DCCF 704 stores data retrieved by the NF service producer 706 in a data repository function ("DRF"), the DCCF 704 also stores in the DRF the identity of the NF service producer 706. If the DCCF 704 receives a service request and the DCCF 704 determines that data is available at a DRF (e.g., if the DRF is the NF service producer 706), the DCCF 704 also needs to verify if the data stored in the DRF retrieved by the NF service producer 706 is allowed to be provided to the NF service consumer 702. This is supported by verifying that the NF service consumer 702 is authorized to access the service provided by the NF service producer 706. This may be supported as follows: 1) the DCCF 704 requests an access token from the NRF to verify that the NF service consumer 702 is authorized to access a service provided by the DR—if the target NF is the DRF; and/or 2) the DCCF 704 requests a second access token from the NRF to verify that the NF service consumer 702 is also authorized to access the service provided by the NF service producer 706 whose data is stored at the DRF—the target NF is the NF service producer 706. In various embodiments, to optimize signaling the DCCF 704 may include both requests in one message to the NRF.

In certain embodiments, if the DCCF 704 receives valid authorization tokens then the DCCF 704 verifies that the NF service consumer 702 is authorized to access the data stored in the DRF.

In some embodiments, if the DCCF 704 receives the NF service consumer 702, the DCCF 704 may extract the information from the access_token (e.g., such as NRF issuer) and include in the authorization request to the NRF the NF instance ID of the NF service consumer 702, the NRF issuer, and the target NF instances (e.g., NF service producer 706). In addition, the DCCF 704 includes the CCA token if provided by the NF service consumer 702. The NRF uses the provided information to authorize the NF service consumer 702 to access indirectly the service of the NF service producer 706 and also authorize the DCCF 704 to initiate an NF service request with a transmission to the NF service producers.

Figure 8:
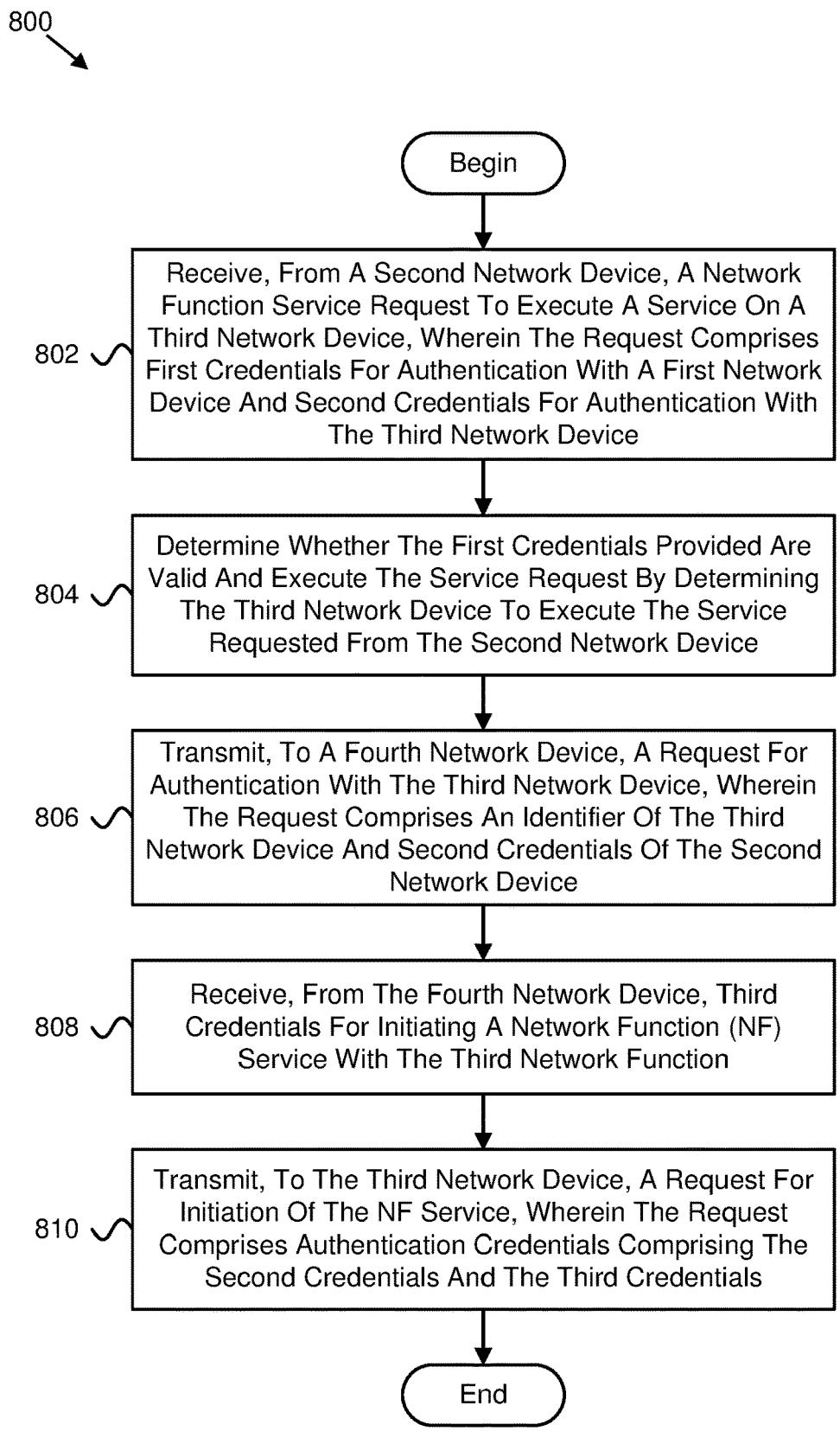
FIG. 8 is a flow chart diagram illustrating one embodiment of a method for authentication for a network service.

FIG. 8 is a flow chart diagram illustrating one embodiment of a method 800 for authentication for a network service. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes receiving 802, at a first network device from a second network device, a network function service request to execute a service on a third network device. The request includes first credentials for authentication with a first network device and second credentials for authentication with the third network device. In some embodiments, the method 800 includes determining 804 whether the first credentials provided are valid and execute the service request by determining the third network device to execute the service requested from the second network device. In certain embodiments, the method 800 includes transmitting 806, to a fourth network device, a request for authentication with the third network device. The request includes an identifier of the third network device and second credentials of the second network device. In various embodiments, the method 800 includes receiving 808, from the fourth network device, third credentials for initiating a network function (NF) service with the third network function. In some embodiments, the method 800 includes transmitting 810, to the third network device, a request for initiation of the NF service. The request includes authentication credentials including the second credentials and the third credentials.

In certain embodiments, the first network device comprises a data collection coordination function (DCCF). In some embodiments, the second network device comprises a NF service consumer. In various embodiments, the fourth network device comprises a network repository function (NRF).

In one embodiment, first credentials are provided for authentication to access the service of the first network device and the second credentials are provided for authentication to access the service of the third network device. In certain embodiments, the third network device comprises an NF service producer. In some embodiments, the service comprises a data request.

In various embodiments, the first credentials comprise a first access token of the second network device assigned from the third network device. In one embodiment, the second credentials comprise a second access token generated from the second network device. In certain embodiments, the third credentials comprise an access token generated from the fourth network device.

Figure 9:
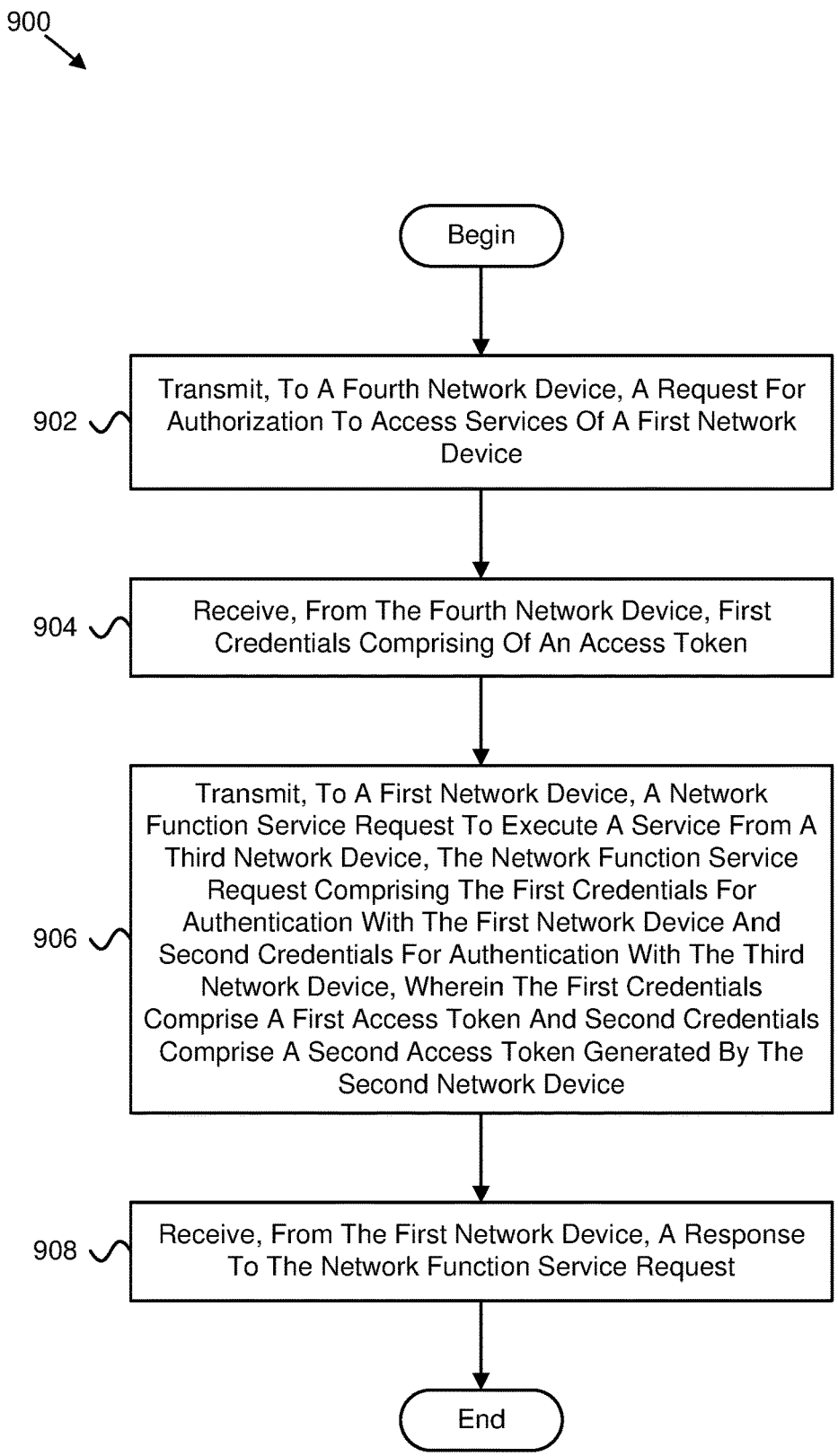
FIG. 9 is a flow chart diagram illustrating another embodiment of a method for authentication for a network service.

FIG. 9 is a flow chart diagram illustrating another embodiment of a method 900 for authentication for a network service. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes transmitting 902, from a second network device to a fourth network device, a request for authorization to access services of a first network device. In some embodiments, the method 900 includes receiving 904, from the fourth network device, first credentials including of an access token. In certain embodiments, the method 900 includes transmitting 906, to a first network device, a network function service request to execute a service from a third network device, the network function service request comprising the first credentials for authentication with the first network device and second credentials for authentication with the third network device. The first credentials include a first access token and second credentials include a second access token generated by the second network device. In various embodiments, the method 900 includes receiving 908, from the first network device, a response to the network function service request.

In certain embodiments, the first network device comprises a data collection coordination function (DCCF). In some embodiments, the second network device comprises a network function (NF) service consumer. In various embodiments, the fourth network device comprises a network repository function (NRF).

Figure 10:
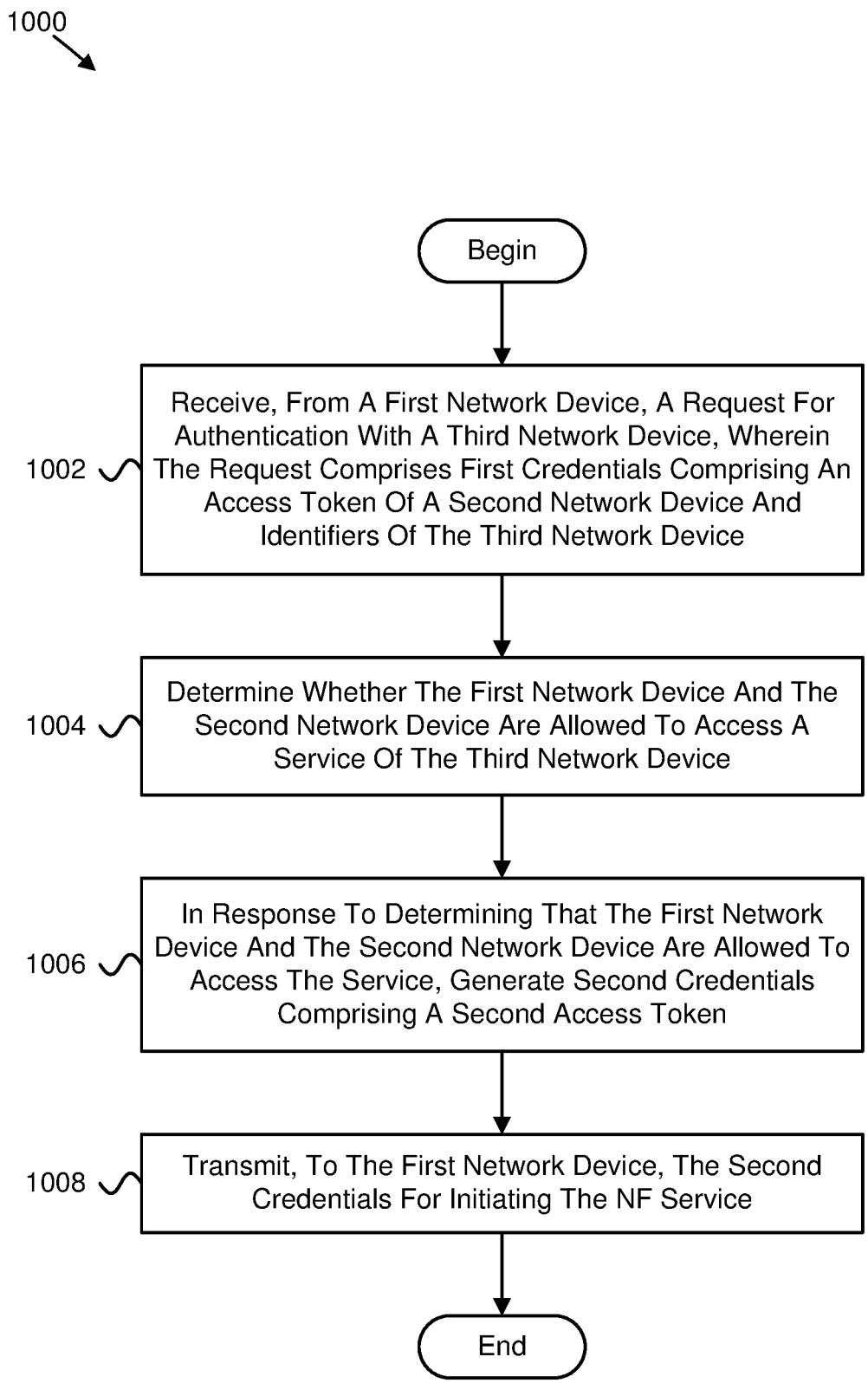
FIG. 10 is a flow chart diagram illustrating a further embodiment of a method for authentication for a network service.

FIG. 10 is a flow chart diagram illustrating a further embodiment of a method 1000 for authentication for a network service. In some embodiments, the method 1000 is performed by an apparatus, such as the network unit 104. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes receiving 1002, at a fourth network device from a first network device, a request for authentication with a third network device. The request includes first credentials including an access token of a second network device and identifiers of the third network device. In some embodiments, the method 1000 includes determining 1004 whether the first network device and the second network device are allowed to access a service of the third network device. In certain embodiments, the method 1000 includes, in response to determining that the first network device and the second network device are allowed to access the service, generating 1006 second credentials including a second access token. In various embodiments, the method 1000 includes transmitting 1008, to the first network device, the second credentials for initiating the NF service.

In certain embodiments, the first network device comprises a data collection coordination function (DCCF). In some embodiments, the second network device comprises a network function (NF) service consumer. In various embodiments, the fourth network device comprises a network repository function (NRF).

In one embodiment, an apparatus comprises a first network device. The apparatus further comprises: a receiver that receives, from a second network device, a network function service request to execute a service on a third network device, wherein the request comprises first credentials for authentication with a first network device and second credentials for authentication with the third network device; a processor that determines whether the first credentials provided are valid and execute the service request by determining the third network device to execute the service requested from the second network device; and a transmitter that transmits, to a fourth network device, a request for authentication with the third network device, wherein the request comprises an identifier of the third network device and second credentials of the second network device, wherein: the receiver receives, from the fourth network device, third credentials for initiating a network function (NF) service with the third network function; and the transmitter transmits, to the third network device, a request for initiation of the NF service, wherein the request comprises authentication credentials comprising the second credentials and the third credentials.

In certain embodiments, the first network device comprises a data collection coordination function (DCCF).

In some embodiments, the second network device comprises a NF service consumer.

In various embodiments, the fourth network device comprises a network repository function (NRF).

In one embodiment, first credentials are provided for authentication to access the service of the first network device and the second credentials are provided for authentication to access the service of the third network device.

In certain embodiments, the third network device comprises an NF service producer.

In some embodiments, the service comprises a data request.

In various embodiments, the first credentials comprise a first access token of the second network device assigned from the third network device.

In one embodiment, the second credentials comprise a second access token generated from the second network device.

In certain embodiments, the third credentials comprise an access token generated from the fourth network device.

In one embodiment, a method of a first network device comprises: receiving, from a second network device, a network function service request to execute a service on a third network device, wherein the request comprises first credentials for authentication with a first network device and second credentials for authentication with the third network device; determining whether the first credentials provided are valid and execute the service request by determining the third network device to execute the service requested from the second network device; transmitting, to a fourth network device, a request for authentication with the third network device, wherein the request comprises an identifier of the third network device and second credentials of the second network device; receiving, from the fourth network device, third credentials for initiating a network function (NF) service with the third network function; and transmitting, to the third network device, a request for initiation of the NF service, wherein the request comprises authentication credentials comprising the second credentials and the third credentials.

In certain embodiments, the first network device comprises a data collection coordination function (DCCF).

In some embodiments, the second network device comprises a NF service consumer.

In various embodiments, the fourth network device comprises a network repository function (NRF).

In one embodiment, first credentials are provided for authentication to access the service of the first network device and the second credentials are provided for authentication to access the service of the third network device.

In certain embodiments, the third network device comprises an NF service producer.

In some embodiments, the service comprises a data request.

In various embodiments, the first credentials comprise a first access token of the second network device assigned from the third network device.

In one embodiment, the second credentials comprise a second access token generated from the second network device.

In certain embodiments, the third credentials comprise an access token generated from the fourth network device.

In one embodiment, an apparatus comprises a second network device. The apparatus further comprises: a transmitter that transmits, to a fourth network device, a request for authorization to access services of a first network device; and a receiver that receives, from the fourth network device, first credentials comprising of an access token, wherein: the transmitter transmits, to a first network device, a network function service request to execute a service from a third network device, the network function service request comprising the first credentials for authentication with the first network device and second credentials for authentication with the third network device, wherein the first credentials comprise a first access token and second credentials comprise a second access token generated by the second network device; and the receiver receives, from the first network device, a response to the network function service request.

In certain embodiments, the first network device comprises a data collection coordination function (DCCF).

In some embodiments, the second network device comprises a network function (NF) service consumer.

In various embodiments, the fourth network device comprises a network repository function (NRF).

In one embodiment, a method of a second network device comprises: transmitting, to a fourth network device, a request for authorization to access services of a first network device; receiving, from the fourth network device, first credentials comprising of an access token; transmitting, to a first network device, a network function service request to execute a service from a third network device, the network function service request comprising the first credentials for authentication with the first network device and second credentials for authentication with the third network device, wherein the first credentials comprise a first access token and second credentials comprise a second access token generated by the second network device; and receiving, from the first network device, a response to the network function service request.

In certain embodiments, the first network device comprises a data collection coordination function (DCCF).

In some embodiments, the second network device comprises a network function (NF) service consumer.

In various embodiments, the fourth network device comprises a network repository function (NRF).

In one embodiment, an apparatus comprises a fourth network device. The apparatus further comprises: a receiver that receives, from a first network device, a request for authentication with a third network device, wherein the request comprises first credentials comprising an access token of a second network device and identifiers of the third network device; a processor that: determines whether the first network device and the second network device are allowed to access a service of the third network device; and, in response to determining that the first network device and the second network device are allowed to access the service, generates second credentials comprising a second access token; and a transmitter that transmits, to the first network device, the second credentials for initiating the NF service.

In certain embodiments, the first network device comprises a data collection coordination function (DCCF).

In some embodiments, the second network device comprises a network function (NF) service consumer.

In various embodiments, the fourth network device comprises a network repository function (NRF).

In one embodiment, a method of a fourth network device comprises: receiving, from a first network device, a request for authentication with a third network device, wherein the request comprises first credentials comprising an access token of a second network device and identifiers of the third network device; determining whether the first network device and the second network device are allowed to access a service of the third network device; in response to determining that the first network device and the second network device are allowed to access the service, generating second credentials comprising a second access token; and transmitting, to the first network device, the second credentials for initiating the NF service.

In certain embodiments, the first network device comprises a data collection coordination function (DCCF).

In some embodiments, the second network device comprises a network function (NF) service consumer.

In various embodiments, the fourth network device comprises a network repository function (NRF).

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for performing a network function (NF), the apparatus comprising:
at least one memory; and
at least one processor coupled with the at least one memory and configured to cause the apparatus to:
receive, from a second network device, a NF service request to execute a service on a third network device, wherein the request comprises first credentials for authentication with a first network device and second credentials for authentication with the third network device, wherein the first credentials comprise a first access token of the second network device assigned from the third network device and wherein the second credentials comprise a second access token generated from the second network device;
determine whether the first credentials provided are valid and execute the service request by determining the third network device to execute the service requested from the second network device;
transmit, to a fourth network device, a request for authentication with the third network device, wherein the request comprises an identifier of the third network device and second credentials of the second network device;
receive, from the fourth network device, third credentials for initiating the NF service with the third network device, wherein the third credentials comprise a third access token generated from the fourth network device; and
transmit, to the third network device, a request for initiation of the NF service, wherein the request comprises authentication credentials comprising the second credentials and the third credentials.

2. The apparatus of claim 1, wherein the apparatus comprises a data collection coordination function (DCCF).

3. The apparatus of claim 1, wherein the second network device comprises a NF service consumer.

4. The apparatus of claim 1, wherein the fourth network device comprises a network repository function (NRF).

5. An apparatus for performing a network function (NF), the apparatus comprising:
at least one memory; and
at least one processor coupled with the at least one memory and configured to cause the apparatus to:
transmit, to a fourth network device, a request for authorization to access services of a first network device;
receive, from the fourth network device, first credentials comprising of an access token;
transmit, to the first network device, a NF service request to execute a service from a third network device, the NF service request comprising the first credentials for authentication with the first network device and second credentials for authentication with the third network device, wherein the first credentials comprise a first access token and second credentials comprise a second access token generated by a second network device, and wherein a third access token is generated based on the second access token; and
receive, from the first network device, a response to the NF service request.

6. The apparatus of claim 5, wherein the first network device comprises a data collection coordination function (DCCF).

7. The apparatus of claim 5, wherein the apparatus comprises a NF service consumer.

8. The apparatus of claim 5, wherein the fourth network device comprises a network repository function (NRF).

9. An apparatus for performing a network function (NF), the apparatus comprising:
at least one memory; and
at least one processor coupled with the at least one memory and configured to cause the apparatus to:
receive, from a first network device, a request for authentication with a third network device, wherein the request comprises first credentials comprising an access token of a second network device and identifiers of the third network device;
determine whether the first network device and the second network device are allowed to access a service of the third network device; and in response to determining that the first network device and the second network device are allowed to access the service, generate second credentials comprising a second access token; and
transmit, to the first network device, the second credentials for initiating a NF service, wherein a third access token is generated based on the second access token.

10. The apparatus of claim 9, wherein the first network device comprises a data collection coordination function (DCCF).

11. The apparatus of claim 9, wherein the second network device comprises a NF service consumer.

12. The apparatus of claim 9, wherein the apparatus comprises a network repository function (NRF).

13. A method of performing a network function (NF), the method comprising:
receiving, from a second network device, a NF service request to execute a service on a third network device, wherein the request comprises first credentials for authentication with a first network device and second credentials for authentication with the third network device, wherein the first credentials comprise a first access token of the second network device assigned from the third network device and wherein the second credentials comprise a second access token generated from the second network device;
determining whether the first credentials provided are valid and execute the service request by determining the third network device to execute the service requested from the second network device;
transmitting, to a fourth network device, a request for authentication with the third network device, wherein the request comprises an identifier of the third network device and second credentials of the second network device;
receiving, from the fourth network device, third credentials for initiating a NF service with the third network device, wherein the third credentials comprise a third access token generated from the fourth network device; and transmitting, to the third network device, a request for initiation of the NF service, wherein the request comprises authentication credentials comprising the second credentials and the third credentials.

14. The method of claim 13, wherein the NF is performed by a data collection coordination function (DCCF).

15. The method of claim 13, wherein the second network device comprises a NF service consumer.

16. The method of claim 13, wherein the fourth network device comprises a network repository function (NRF).

* * * * *